United States Patent [19]
Muller

[11] 3,819,278
[45] June 25, 1974

[54] TURBIDITY MEASURING DEVICE WITH MEANS FOR PREVENTING THE FORMATION OF BUBBLES

[76] Inventor: Hans Muller, Im Almendli, Erlenbach, Zurich, Switzerland

[22] Filed: July 21, 1972

[21] Appl. No.: 274,064

[30] Foreign Application Priority Data
July 23, 1971 Switzerland.................. 11004/71
July 30, 1971 Switzerland.................. 11151/71

[52] U.S. Cl................... 356/208, 250/227, 356/181, 356/246
[51] Int. Cl................... G01n 21/26, G01j 3/46
[58] Field of Search.......... 356/201, 208, 246, 181; 250/218, 227

[56] References Cited
UNITED STATES PATENTS
2,324,304  7/1943  Katzman........................ 356/208
2,892,378  6/1959  Canada......................... 356/208
3,714,444  1/1973  Carr et al...................... 356/208

Primary Examiner—Vincent P. McGraw
Attorney, Agent, or Firm—Michael S. Striker

[57] ABSTRACT

A culture vessel has an outer wall and is adapted to accommodate a substance whose turbidity is to be measured. A measuring unit for turbidity measurements is mounted on the outer wall and includes a light source and a photoelectric receiver which are located exteriorly of the vessel, and a light guide cooperating with the source and the receiver and extending into the interior of the vessel where portions of it define with one another a gap immersed in the substance so that light passes across this gap and will be influenced by the turbidity of the same. The portions of the light guide which are located in the vessel are surrounded by a sleeve which has an unobstructed open end and is provided with apertures in its circumferential wall.

7 Claims, 1 Drawing Figure

PATENTED JUN 25 1974 3,819,278
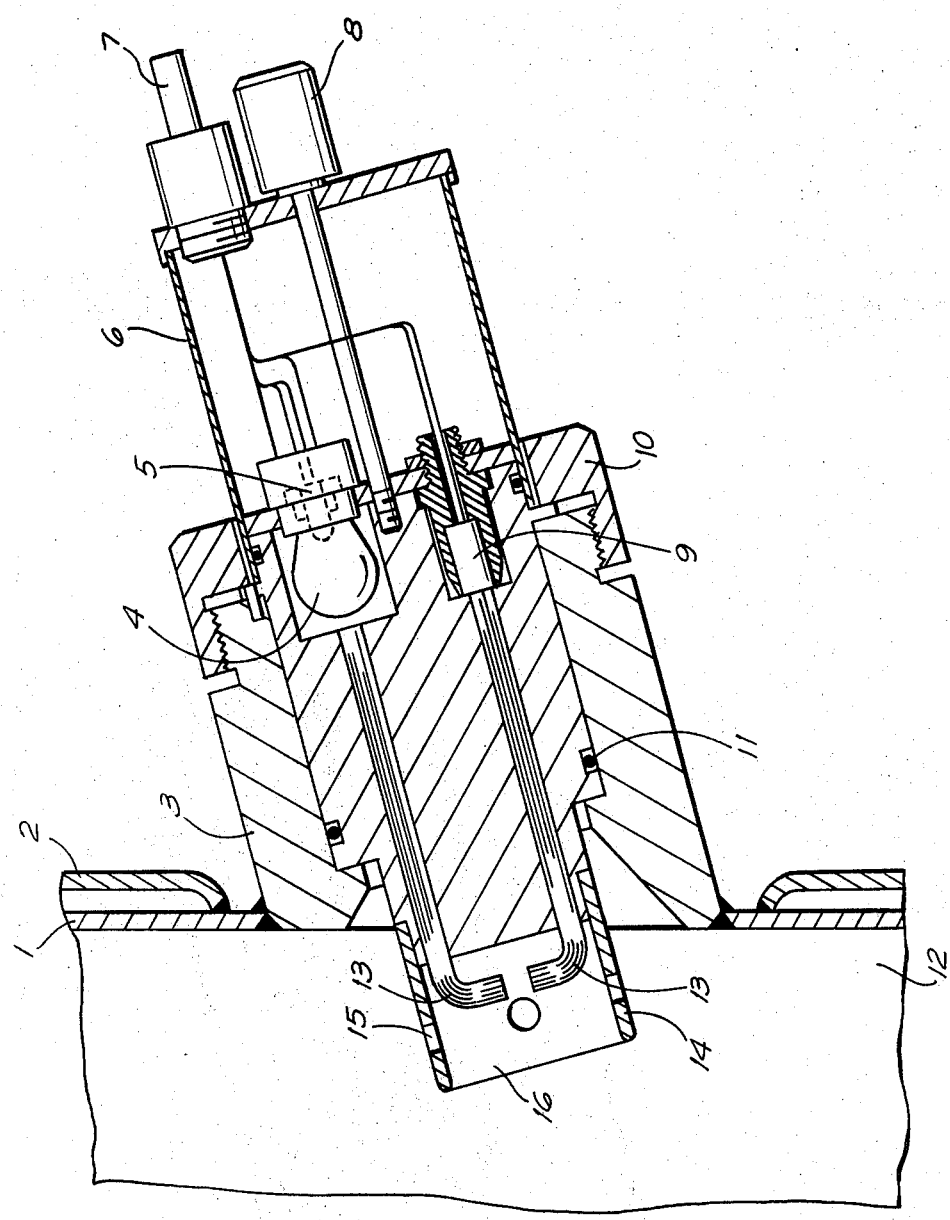

TURBIDITY MEASURING DEVICE WITH MEANS FOR PREVENTING THE FORMATION OF BUBBLES

BACKGROUND OF THE INVENTION

The present invention relates generally to a culture-growing apparatus, and more particularly to a culture-growing apparatus including an arrangement for measuring the turbidity of the contents of the apparatus.

In many instances it is important to control the growth of organisms in a culture-growing apparatus, and this is particularly true in continuously operating fermentation apparatus. There, the supply of nutrient substance as well as the removal of substrate carrying microorganisms of the desired concentration, are controlled in dependence upon turbidity measurements which are effected photoelectrically. This is usually effected in that a small pump withdraws contents from the fermentation vessel, supplies them to an external cell and after measuring in the cell, returns the withdrawn contents into the vessel. In the cell itself the turbidity is measured continuously by a photoelectric cell and light source, and the measured values are then utilized for regulating the supply of nutrient fluid and the withdrawal of contents or substrate having microorganisms of the desired concentration.

The difficulty with the prior art is that there are certain disadvantages involved. In particular, the removal and return of contents to be measured as to their turbidity, requires a separate conduit system employing a pump, a measuring cell and the like. This, in turn, requires special cleaning and sterilization steps beyond those necessary for normal cleaning and sterilization of the culture vessel of the fermentation apparatus. Moreover, in particular the removal and withdrawal conduits required for this purpose constitute a danger of infection, because they are not readily accessible for cleaning purposes.

Other problems also exist and will be discussed subsequently.

SUMMARY OF THE INVENTION

It is, accordingly, a general object of the present invention to overcome the disadvantages of the prior art.

More particularly it is an object of the present invention to provide an improved culture-growing apparatus in which the turbidity of the contents can be readily measured.

Still more particularly it is an object of the present invention to provide such an improved culture-growing apparatus in which the accuracy of turbidity measurements is assured.

In pursuance of these objects, and of others which will become apparent hereafter, one feature of the invention resides, in a culture-growing apparatus, in a combination which briefly stated comprises a culture vessel having an outer wall and adapted to accommodate a substance whose turbidity is to be measured. Turbidity measuring means is mounted on the outer wall and includes a light source, a photoelectric receiver and light-conductor means operatively associated with the source and the receiver for conducting light from the former to the latter. The light-conductor means has portions defining a gap and which are located wholly within said vessel so as to be immersed in the substance therein. In this manner changes in the turbidity of the substance cause changes in the amount of light capable of traversing the gap and reaching the receiver.

Particularly in fermentation apparatus another problem has been observed, namely in such vessels the liquid nutrient medium and the supplied gases such as air or gaseous hydrocarbons, are circulated by a usually axially arranged circulating and dispersion device, and a dispersion is formed of them. However, the dispersion is not always evenly "homogenized" and it has been observed that in the vicinity of projections in the vessel, of the recesses and the like the homogenization may break down and large gas bubbles or drops of hydrocarbons may develop which will uncontrollably influence the turbidity measurements. Such difficulties can arise even in the region of those portions of the light-conductor means which are to be located in the interior of the culture vessel, as outlined above. This is particularly true if the portions of the light-conductor means in question are surrounded by a protective housing, as would normally be desirable in order to protect them against damage of a mechanical nature.

To overcome these problems a further concept of the invention provides for a sleeve surrounding those portions of the light-conductor means which are located within the vessel, this sleeve having —according to the invention— a circumferential wall which is provided with apertures and a free open end which is entirely unobstructed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a fragmentary partially sectioned and somewhat diagrammatic view, illustrating one embodiment of the invention.

DESCRIPTION OF THE PREFERRED EMBODIMENTS

Discussing the drawing in detail it will be seen that the vessel itself is identified with reference numeral 1 and is shown only fragmentarily. It will be understood that the vessel can have any of the various conventional forms, and can in accordance with the usual practice be cylindrical. The outer wall of the vessel is provided in this embodiment with a second wall 2 which defines with it a gap in which a heat-exchange fluid (for cooling or heating purposes) can be circulated.

The wall of the vessel 1 is provided with an opening which is closed by a substantially sleeve-shaped casing 3 which is welded (as illustrated) to the wall of the vessel 1 in sealing relationship therewith. In the illustrated embodiment the longitudinal axis of the casing 3 is somewhat inclined with respect to the longitudinal axis of the vessel 1, which axis of the vessel 1 is to be understood as being an upright axis in the illustrated embodiment.

A measuring unit for turbidity measuring purposes is removably accommodated in the casing 3. The unit comprises a light source 4, for instance a conventional bulb, and an associated monitoring device in form of a photocell 5. The unit further comprises a photoresistor 9 and light-conductor means 13, 13'. The light-conductor means may be in form of a light guide or of optical fibers, both of which are well known in the art. The light conductor means 13 receives light from the source 4 and the light conductor means 13' conducts light to the resistor 9. The inner end portions of the light conductor means 13, 13' are located wholly within the vessel 1, defining between one another the illustrated gap so that light originating from the light source 4 and passing along the light-conductor 13, can enter the light-conductor 13' only at the end face therein which is located within the vessel 1 and which is juxtaposed across the illustrated gap with the similar endface of the light-conductor 13. This means that any light which reaches the photoresistor 9 must have traversed this gap. Because the gap is wholly immersed within the (non-illustrated) contents of the vessel 1 whose turbidity is to be measured, any change in the turbidity of the contents will be reflected by a change in the amount of light which can traverse this gap. Evidently, the greater the turbidity of the contents, the less light will be able to pass across the gap and this will be sensed by the photoresistor 9. The converse is, of course, also true.

The electrical conductors for supplying electricity to the light source 4 as well as for carrying signals from the photocell 5 and the resistor 9, are all combined in a single cable 7, and the connections of the various cables with the elements 4, 5 and 9 are covered by a protective cap 6 through which the cable 7 passes into the interior thereof. The cap 6 is retained on the casing 3 in suitable manner, here by means of the long-shank knurled screw 8, although different means could be employed.

It will be appreciated that the light source 4, the photocell 5 and the resistor 9 can be removed as a unit if and when necessary, for instance when the vessel 1 is to be sterilized by steam or in other ways. To remove the unit it is merely necessary to unscrew the nut 10 from the casing 3. The unit is sealed with respect to the interior of the vessel 1 by means of appropriate O-rings 11 which are illustrated as being located in suitable grooves. Keys may be provided which assure that the unit will always be inserted into the casing 3 in the desired orientation.

To overcome difficulties which may be observed particularly in fermentation vessels, that is if the vessel 1 is a fermentation vessel, and which may result from a breakdown of homogenization of the vessel contents and the formation of gas bubbles or drops of hydrocarbons or the like, in the vicinity of the inner end portions of the light conductor means 13, 13', as well as to protect these inner end portions against mechanical damage, the embodiment of the invention which is illustrated by way of example provides for a cylindrical sleeve 14 whose circumferential wall is provided with a plurality of apertures 15 and whose free axial end 16 is completely open and unobstructed. With the other axial end the sleeve 14 is connected with the turbidity measuring unit.

With the construction as illustrated the disadvantages of the prior art are overcome. Not only does the construction make it possible to readily clean and sterilize the vessel 1, in that the parts accommodated in the casing 3 can be completely removed, but, where problems with the formation of gas bubbles or drops of hydrocarbon result in a fermentation vessel provided with the present invention, these problems are also overcome. In particular, the substance accommodated in the vessel is continuously circulated by the circulating and dispersion device (not illustrated) located in the fermentation vessel against the open end 16 of the sleeve 14. It thus passes into the gap between the juxtaposed end faces of the light-conductor means 13 and 13', permitting the necessary turbidity measurement. The substance entering through the open end 16 will constantly escape through the aperture 15 back into the vessel 1, and as a result of the fact that the cross-sectional area of the apertures 15 is substantially smaller than that of the free open end 16 of the sleeve 14, the flow of the substance through these apertures 15 is retarded, preventing an expansion of the gases dispersed in the substance and the formation of gas bubbles. Evidently, various modifications can be made without departing from the intent of the invention. In applications where the influencing of the turbidity measurements by the formation of gas bubbles or the like need not be feared, the sleeve 14 might be omitted (if there is no danger of damage to the inner end portions of the light-conductor means 13, 13') or it might be replaced by a sleeve which does not have the open end 16 and the apertures 15, but which for instance have only one of these measures. Conversely, it is possible to supply sleeve 14 in all applications because it does not have any disadvantageous influences on the accuracy of the measurements, no matter in what applications it is employed, and because it does of course provide the desired mechanical protection of the inner end portions of the light-conductor means 13, 13' irrespective of the other function which it has and which has been described above.

The nut 10 could be replaced with a different type of retaining device, for instance a bayonet closure, and other similar modifications could be made without departing from the intent of the invention.

It will be understood that each of the elements described above, or two or more together, may also find a useful application in other types of applications differing from the types described above.

While the invention has been illustrated and described as embodied in a culture-growing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a culture-growing apparatus, a combination comprising a culture vessel having an outer wall and adapted to accommodate a substance whose turbidity is to be measured and which tends to form bubbles as said substance is circulated in said vessel in a path; and turbidity measuring means mounted on said outer wall and including a light source, a photoelectric receiver, light conductor means operatively associated with said source and said receiver for conducting light from the former to the latter, and a sleeve having an open end and a circumferential wall provided with a plurality of apertures and extending into said path so that the substance being circulated enters said sleeve through said open end and exits therefrom through said apertures thereof, said apertures retarding the circulation of said substance in said path and preventing formation of bubbles within the confines of said sleeve, and said light conductor means having portions accommodated within the confines of said sleeve and defining a gap into which said substance circulating in said path enters and being traversed by the light being conducted from said light source to said receiver, whereby changes in the turbidity of the substance cause changes in the amount of light capable of traversing said gap and reaching said receiver.

2. A combination as defined in claim 1, wherein said open end of said sleeve is entirely unobstructed.

3. A combination as defined in claim 1, wherein said light-conductor means comprises optical fibers.

4. A combination as defined in claim 1, said turbidity measuring means further comprising a sleeve-shaped casing fast with said outer wall exteriorly of said vessel and accommodating said light source and said photoelectric receiver.

5. A combination as defined in claim 4, wherein said light-conductor means is elongated and extends axially of said sleeve-shaped casing, and through said outer wall into said vessel.

6. A combination as defined in claim 5, wherein said vessel has a longitudinal first axis, and said sleeve-shaped casing has a longitudinal second axis which is inclined with reference to said first axis.

7. A combination as defined in claim 1, wherein said light source, said receiver and said light conductor means are combined into a structural unit.

* * * * *